Jan. 11, 1938.                G. H. BLETTNER                2,104,893
                                PISTON
                         Filed April 23, 1936        3 Sheets-Sheet 1
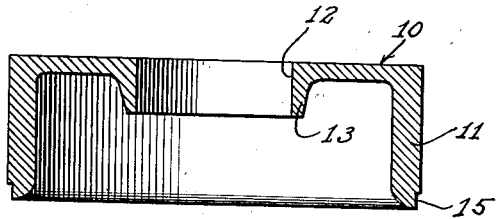
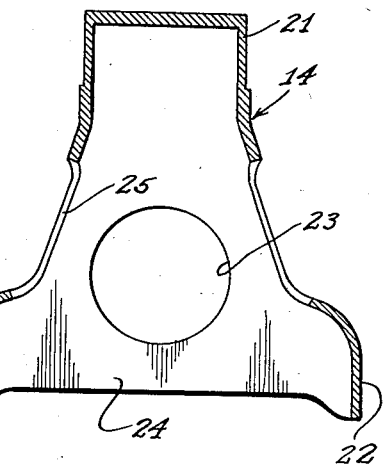
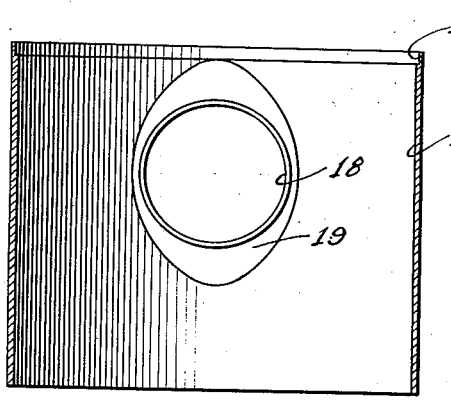
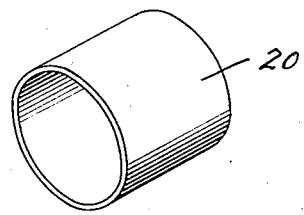
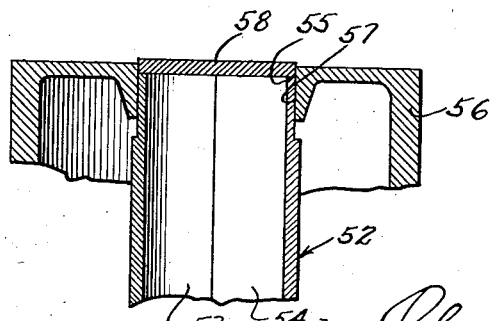
Inventor
GEORGE H. BLETTNER.

Jan. 11, 1938.　　　　G. H. BLETTNER　　　　2,104,893
PISTON
Filed April 23, 1936　　　3 Sheets-Sheet 2
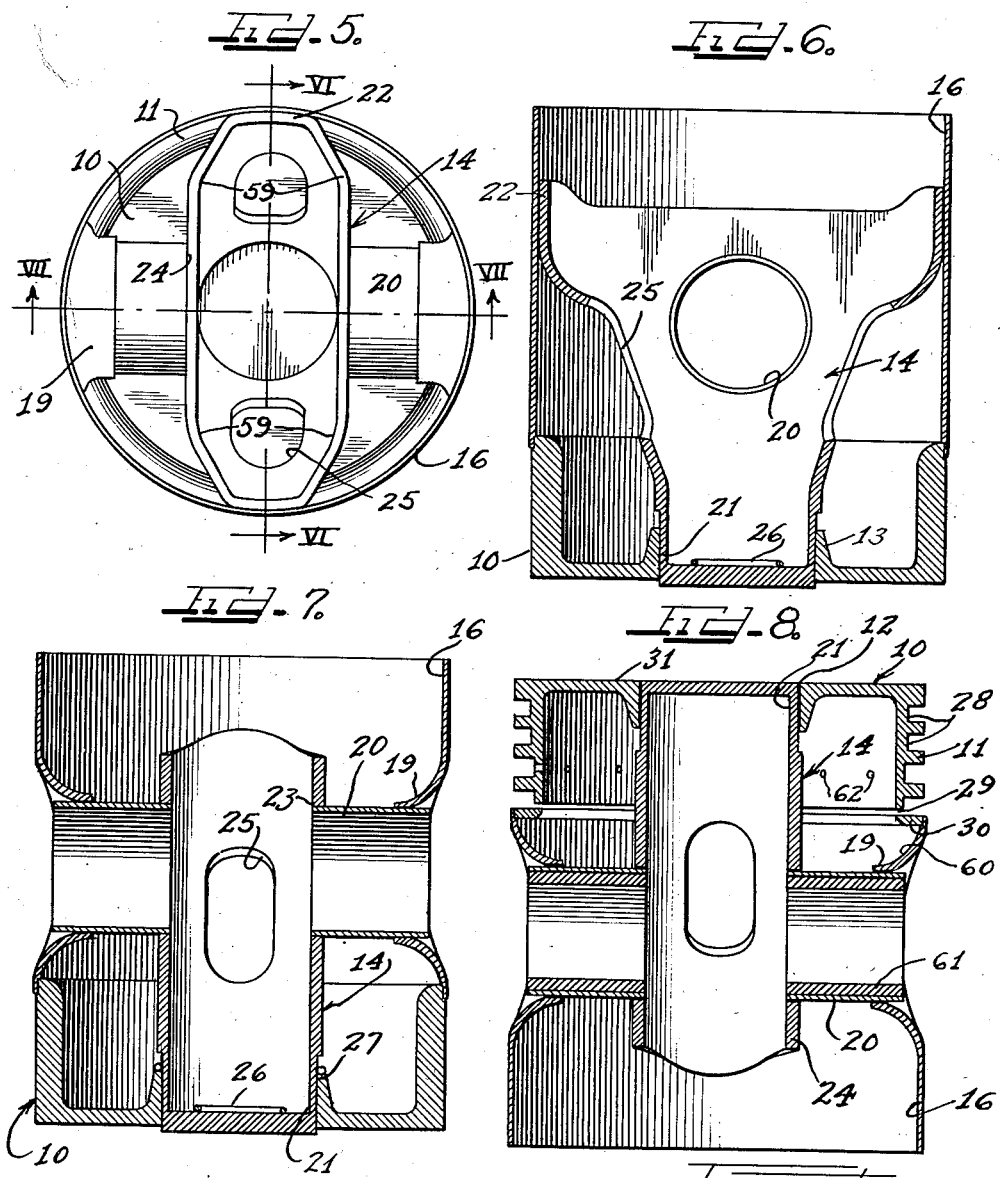
Inventor
GEORGE H. BLETTNER.
by Charles O'Neill Attys.

Jan. 11, 1938.  G. H. BLETTNER  2,104,893
PISTON
Filed April 23, 1936   3 Sheets-Sheet 3
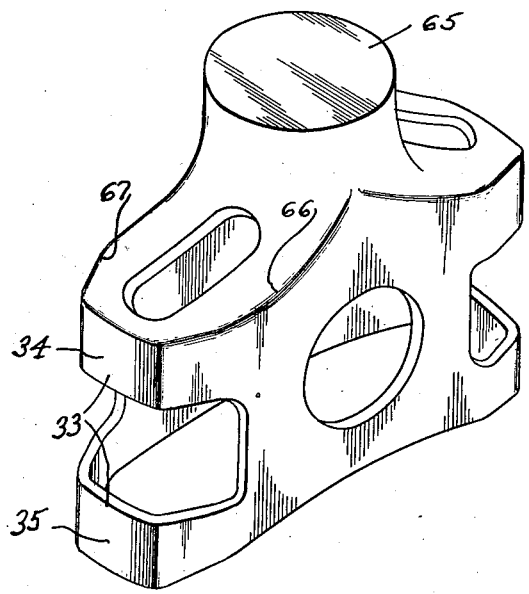
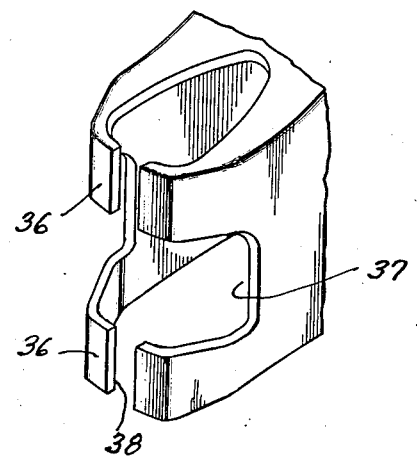
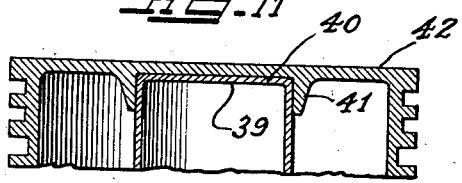
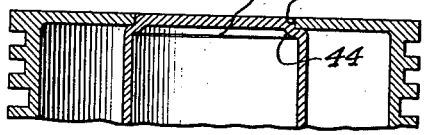
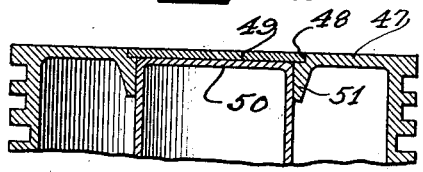
Inventor
GEORGE H. BLETTNER.
by Charles Trahill Attys.

Patented Jan. 11, 1938

2,104,893

UNITED STATES PATENT OFFICE 2,104,893

PISTON

George H. Blettner, Chicago, Ill., assignor to Renette Company, Chicago, Ill., a corporation of Illinois Application April 23, 1936, Serial No. 75,917

9 Claims. (Cl. 309—14)

This invention relates to a piston and more particularly to a composite, all steel piston for use in internal combustion engines of the stationary and automotive type.

My present invention contemplates separately forming a head, skirt, bridge or strut member and wrist pin thimbles and after assembling these parts in their proper relative position, securing the assembled parts together, preferably by means of copper brazing in a reducing atmosphere, to provide a composite all steel piston. The construction of the head, skirt, bridge member and wrist pin thimbles is such that when these parts are assembled and secured together they mutually cooperate to provide a piston having great strength but of comparatively light weight.

It is therefore an important object of this invention to provide a composite, all steel piston of a novel and improved construction.

It is a further important object of this invention to provide a composite all steel piston comprising a head, a skirt, a bridge member and wrist pin thimbles brazed together to provide an integral assembly of great strength and comparative lightness.

It is a further important object of this invention to provide a piston wherein a bridge or strut member and wrist pin thimbles constitutes the connecting means between the head of the piston and the skirt portion and also wherein the bridge member is triangulated to provide reinforcement for the skirt.

Other and further important objects of this invention will become apparent from the disclosures in the specification and the accompanying drawings.

This invention (in a preferred form) is illustrated in the drawings and hereinafter more fully described.

On the drawings:

Figure 1 is a transverse sectional view of a preformed head portion;

Figure 2 is a longitudinal sectional view of a preformed skirt portion;

Figure 3 is a longitudinal sectional view of a bridge or strut member for use in connecting the head portion of Fig. 1 and the skirt portion of Fig. 2;

Figure 4 is an isometric view of a sleeve or thimble for receiving a wrist pin;

Figure 5 is a top plan view of the aforesaid parts in assembled relation;

Figure 6 is a longitudinal sectional view of the assembled parts taken substantially along the line VI—VI of Fig. 5;

Figure 7 is a longitudinal sectional view taken substantially along the line VII—VII of Fig. 5;

Figure 8 is a longitudinal sectional view of a finished composite steel piston in normal position, made in accordance with my invention;

Figure 9 is an isometrical view of a modified form of a strut or bridge member;

Figure 10 is a fragmentary isometric view of a further modification of strut or bridge member;

Figure 11 is a transverse fragmentary sectional view of a modification of piston head construction;

Figure 12 is a fragmentary transverse sectional view of a further modified form of piston head construction;

Figure 13 is a fragmentary transverse sectional view of a still further modification of piston head construction, and Figure 14 is a fragmentary transverse sectional view of a piston head illustrating a two part bridge member.

As shown on the drawings:

The reference numeral 10 (Figs. 1 to 8 inclusive) indicates a head portion, preferably formed of low carbon steel and provided with an integral peripheral flange 11 of sufficient thickness to permit the forming therein of piston ring receiving grooves. Said head 10 is provided with a central opening 12 (Fig. 1), inwardly flanged as at 13 to provide a cylindrical bore for receiving the end of a bridge or strut member, indicated generally by the reference numeral 14. The flange 11 is provided at its lower edge with a pilot 15 to snugly receive a skirt portion 16 and be united therewith.

Said head 10 may be formed of any steel, such as SAE #1010, which is suitable for use in a stamping, deep drawing or forging operation. The head may, however, be cast, or it may be machined from bar stock of SAE specification #1112 or #X1112.

The skirt 16, which may suitably be formed by a drawing operation from a flat sheet of steel of SAE specification #1020, is cylindrical in shape and of such diameter as to snugly fit over the pilot 15 of the head 10. If desired, the cylindrical skirt 16 may be provided with an inner peripheral recess 17 for receiving the pilot 15. Said skirt 16 is also provided with aligned openings 18, which may be formed by piercing indentations at diametrically opposite points, thereby providing inwardly turned flanges 19 (Figs. 7 and 8). Said flanges 19 serve to receive and be united with wrist pin thimbles 20 (Fig. 4).

The bridge or strut member 14 may be formed by a drawing operation, or series of operations, from sheet steel of SAE specification #1010° or #1020, or from other suitable steels. Said bridge member is of hollow construction and, as shown in Figs. 3, and 5 to 8 inclusive, is generally conical or Y-shaped, but flattened sidewise. Said bridge member comprises a closed cylindrical end portion 21 of the proper diameter to fit snugly into the bore 12 and engage with the flange 13 thereof. The other end of said bridge member is flared outwardly to provide arcuate cylindrical surfaces 22 of such diameter as to tightly engage the inner cylindrical surface of the skirt 16 when the bridge member is assembled in place.

Said bridge member is also provided with oppositely positioned aligned openings 23, positioned in the flattened faces 24, for receiving the inner ends of the wrist pin thimbles 20. The intermediate walls of said bridge member 14 may be provided with openings or slots 25 to give a lighter and more resilient construction and also to provide for the escape of any gases that might be trapped therein.

The wrist pin thimbles 20 may suitably be formed from tubular material of steel of SAE specification #1020. Said wrist pin thimbles 19 are adapted to be inserted through the flanged openings 18 to be supported by the flanges 19 at one end and within the openings 23 of the bridge member 14 at the other end.

The head, skirt, bridge member and wrist pin thimbles are assembled as shown in Figs. 5 to 7 inclusive. As so assembled, the parts are self-aligning owing to their construction and the snug, press fit of the joints so formed. The skirt 16 is placed onto the pilot 15 of the head 10 and the tubular closed end 21 of the bridge member 14 is inserted into the flanged opening 12 of the head to properly align the skirt and head portion. The thimbles 20, when inserted in place, serve to align the openings 18 in the skirt and the openings 23 in the bridge member. All of the joints thus formed have a press fit, sufficiently snug to maintain the parts in assembled relation during the subsequent operation.

Preparatory to securing the parts together, suitable brazing material, such as copper wire 26, is positioned at the bottom of the closed end 21, or adjacent one or more of the joints between the parts, as at the joint 27. It will be understood that other forms of brazing material may be used, such as rings or sheets of copper or copper containing material, such as brass, or the surfaces of the joints may be coated with a copper bronze or copper powder, or they may be copper plated.

The assembled parts, with the brazing material in place, are next placed in a furnace having a reducing atmosphere and the temperature uniformly raised to between 1700 and 2100° F., or to other sufficiently high temperatures, to cause the brazing material to melt and flow between the joints by capillary action. To facilitate this, the assembled composite piston is preferably placed in the furnace in an inverted position such as shown in Fig. 6. In the reducing atmosphere of the furnace, the copper brazing material is drawn by capillarity between the parts forming the several joints to effect a brazing of said parts. The tighter the joints, the more readily will the brazing material be drawn into them and the stronger will be the union formed.

After the composite piston has been subjected to the proper temperature to complete the brazing operation, it is preferable to submit it to a heat treatment to restore the strength of the metal. For this purpose, the composite piston is cooled to a temperature below the critical range of the steels employed and the temperature then adjusted to within the critical range, which, in general, will be between 1450 and 1600° F. The temperature is maintained within the critical range for a suitable length of time, sufficient to enable all parts of the piston to come to the same temperature, and then the composite piston is quenched rapidly in cold brine or other suitable cooling medium. This method of heat treatment is described and claimed in my copending application Serial No. 70,334, filed March 23, 1936.

The composite piston is now ready to be machined to final form and the head provided with grooves 28 for receiving piston rings (not shown). Preferably, the outer periphery of the skirt 16 is entirely separated from the head 10 by severing the lower portion of the head, as at 29, to leave a ring portion 30 of the metal of the head as a reinforcing flange for the upper portion of the skirt 16. Other common means of and steps for finishing the piston may be employed. Bearing bushings or sleeves 61 are positioned in the wrist pin thimbles 20 (Fig. 8). Bleeder holes 62 are provided in the bottom of one of the lower grooves 28.

In its finished form, the piston comprises a head portion 10, the central aperture 12 of which is closed to combustion by the closed end 21 of the bridge member 14, the external surfaces 31 of said head and closed bridge end being machined to lie in the same plane and to provide the required thickness of the head end wall. The bridge member 14 and thimbles 20 constitute the connecting means for the head 10 and the skirt 16 and provide a sufficiently resilient, yet rigid reinforcement for said skirt to enable the piston to withstand the severe conditions to which it may be subjected in an internal combustion engine.

In the operation of finishing the composite piston, the thickness of the cylindrical portion of the skirt is reduced somewhat, leaving the flange walls 19, however, of their original thickness, as shown at 60 (Fig. 8).

In Fig. 9 there is shown a bridge member 32 of a slightly modified form, wherein the segmental cylindrical surfaces 33 are slotted transversely of their axial length to provide separate surfaces 34 and 35. The width of the surfaces 33 should be considerably less than the diameter of the end 65 so that the radially extending portions 66 may be smoothly tapered, as at 67, toward said surfaces. This construction imparts resiliency to the bridge member, allowing it to conform more readily to expansion and contraction of the skirt.

A further modification of this construction is shown in Fig. 10, wherein the segmental cylindrical surfaces 36 are slotted both transversely, as at 37, and axially of their length, as at 38. This modified form of construction imparts even greater resiliency and adaptability to the bridge member and also enables that member to be made of lighter, more open construction.

The manner of joining the bridge member with the head may also be modified, as indicated in Figs. 11 to 13 inclusive. In Fig. 11, the closed end 39 of the bridge member is received into a recess 40 formed by an annular inwardly extending flange 41 provided on the head 42. In this construction no opening is provided in the central part of the head, but the closed end of the bridge member is merely brazed to the inside of the head with a peripheral flange for additional strength and reinforcement.

In Fig. 12, the closed end 43 of the bridge member is provided with a reduced end portion 44 adapted to fit within a central aperture 45 in the head 46 and be brazed therein.

In Fig. 13, the construction is somewhat similar to that of Fig. 11, except that the head 47 is provided with a shouldered aperture 48 for receiving a disk 49, against which abuts the closed end 50 of a bridge member. An inwardly extending peripheral flange 51 snugly engages the closed end 50 of the bridge member and all of the joints thus formed are united, as by copper brazing.

In Fig. 14 there is shown a bridge member 52 which is formed in two complementary halves 53 and 54 and with an open end 55. The advantage of forming the bridge member in two sections resides in the ease with which the sections can be stamped out of sheet steel and also in the greater adaptability of the two-piece bridge member to fit into the piston head and skirt.

As shown in Fig. 14, the head 56 is provided with a flanged opening 57 for receiving the end of the bridge member 52. A disk 58 serves to close said bridge end and the opening 57. The bridge 52 may otherwise be of triangulated construction as shown in Figs. 3, 9 and 10. Except for the sectioning and closed end, Fig. 3 would represent one-half or complementary part of the type of bridge shown fragmentarily in Fig. 14.

One of the important features of the bridge construction is that it provides a certain amount of adaptability to variations in the dimensions of the skirt without sacrificing its strength as a reinforcement for the skirt. For instance, if the skirt gets slightly out-of-round as a result of the brazing operation, it may be easily brought back to cylindrical shape without weakening the bridge member. The rounded portions 59 (Fig. 5) permit the bridge members to give where desired without buckling the skirt.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A piston structure comprising a head, a cylindrical skirt having diametrically opposite wrist pin openings, a hollow strut member having a cylindrical end bonded to said head and having outwardly flared portions providing arcuate surfaces of reduced width relative to said end conforming with and bonded to the inside of said skirt along areas intermediate said wrist pin openings, said strut member having wrist pin openings in opposed walls in alignment with said skirt wrist pin openings, and thimbles extending between said walls and skirt and secured in said openings whereby said skirt is rigidly supported from said head and is cross-braced by said strut and thimbles.

2. A piston structure comprising a head, a cylindrical skirt having diametrically opposite wrist pin openings, a hollow sheet metal strut member having a closed cylindrical end bonded to said head and having outwardly flared portions providing arcuate surfaces of reduced width relative to said end conforming with and bonded to the inside of said skirt along areas midway between said wrist pin openings, said strut member having wrist pin openings in opposed walls in alignment with said skirt wrist pin openings, and thimbles extending between said walls and skirt and secured in said openings whereby said skirt is rigidly supported from said head and is cross-braced by said strut and thimbles.

3. A piston structure comprising a head, a cylindrical skirt having diametrically opposite wrist pin openings, a hollow sheet metal strut member having a closed cylindrical end bonded to said head and having longitudinally split outwardly flared portions providing spaced arcuate surfaces of reduced width relative to said end conforming with and bonded to the inside of said skirt along areas midway between said wrist pin openings, said strut member having wrist pin openings in opposed walls in alignment with said skirt wrist pin openings, and thimbles extending between said walls and skirt and secured in said openings whereby said skirt is rigidly supported from said head and is cross-braced by said strut and thimbles.

4. The combination with a piston having a head end, a skirt, and wrist pin thimbles secured to said skirt and extending inwardly therefrom in axial alignment, of a bridge member for compensating and balancing the stresses due to temperature changes to which said piston is subjected under the working conditions of an internal combustion engine, said bridge member being secured to said head, said skirt and the inner ends of said thimbles to cross brace said skirt, the secured portions of said bridge member and skirt lying between planes passing across and including the inner ends of said thimbles and being of substantially less width than the distance between said planes.

5. The combination with a piston having a head end, a skirt, and wrist pin thimbles secured to said skirt and extending inwardly therefrom in axial alignment, of a bridge member for compensating and balancing the stresses due to temperature changes to which said piston is subjected under the working conditions of an internal combustion engine, said bridge member comprising a hollow sheet metal strut having a reduced end secured to said piston head end and having opposed flattened faces joined by oppositely flared portions extending into conforming contact with and secured to said skirt along areas lying well within the planes of said flattened faces, said flattened faces being provided with aligned openings for receiving the inner ends of said thimbles.

6. In a piston including a head end, a skirt having aligned openings, and wrist pin thimbles having their outer ends secured in said openings, the combination therewith of a sheet metal bridge member having a reduced end secured to said head, flattened wall portions extending from said reduced end and provided with openings aligned with said skirt openings into which the inner ends of said thimbles extend and are secured, and peripheral intermediate wall portions integrally joined to said flattened wall portions by converging surfaces and curved to conform to said skirt, said conformingly curved portions being secured to said skirt along areas lying between the planes of said flattened wall portions and of substantially less width than the distance between said planes.

7. In a piston including a head end, a skirt having aligned openings therein, and wrist pin thimbles secured at their outer ends in said openings, the combination therewith of a separately formed sheet metal bridge member having a reduced tubular end secured to said head end and having oppositely disposed curved portions conforming to and secured to said skirt, said curved portions being integrally joined to said reduced end by flared wall portions and by intermediate flattened portions, said flattened portions having aligned apertures for receiving the inner ends of said thimbles.

8. In an all steel piston, including a head end, a sheet metal skirt secured thereto and a pair of wrist pin thimbles secured at their outer ends in said skirt, the combination therewith of a hollow, flexible, sheet metal bridge member having a cylindrical end secured to said head end and having oppositely disposed apertured flared wall portions extending into conforming contact with said skirt and secured thereto, said bridge member also having flattened wall portions apertured to receive the inner ends of said thimbles and bowed toward each other to merge into said skirt conforming flared wall portions.

9. In a piston having a closed head end, a sheet metal skirt secured thereto and a pair of wrist pin thimbles secured at their outer ends in said skirt, the combination therewith of a hollow flexible bridge member of sheet metal having a tubular end secured to the inside of said head end and having a pair of opposed walls flaring outwardly from said tubular end into conforming surface contact with said skirt and having a pair of flattened walls between said flared walls bowed toward each other at their edges to merge into said skirt conforming wall portions, said flattened walls being apertured to receive the inner ends of said wrist pin thimbles, said bridge member being directly bonded to said skirt only along said conforming surfaces of contact.

GEORGE H. BLETTNER.